United States Patent [19]

Cicatelli

[11] 4,102,517
[45] Jul. 25, 1978

[54] TAPE DRIVING APPARATUS FOR TAPE PLAY-BACK AND/OR RECORDING DEVICES

[75] Inventor: Rodolfo Cicatelli, Gandria, Switzerland

[73] Assignee: Autovox S.p.A., Rome, Italy

[21] Appl. No.: 720,399

[22] Filed: Sep. 3, 1976

[30] Foreign Application Priority Data

Sep. 10, 1975 [IT] Italy ............................. 51283A/75

[51] Int. Cl.$^2$ ...................... G11B 15/30; G11B 15/29
[52] U.S. Cl. ..................................... 242/201; 242/209
[58] Field of Search ............... 242/201, 202, 203, 204, 242/208, 209, 210, 206, 193, 194, 199, 200

[56] References Cited

U.S. PATENT DOCUMENTS

| 3,417,936 | 12/1968 | Paape ................................. 242/201 |
| 3,550,984 | 12/1970 | Moore ................................ 242/201 |
| 3,724,859 | 4/1973 | Kobler et al. ..................... 242/201 |
| 3,785,586 | 1/1974 | Engert et al. ..................... 242/201 |

FOREIGN PATENT DOCUMENTS

921,253  3/1963  United Kingdom ................. 242/201

*Primary Examiner*—George F. Mautz
*Attorney, Agent, or Firm*—James W. Gillman; Donald J. Lisa; Phillip H. Melamed

[57] ABSTRACT

A tape drive system for tape play-back and/or recording devices is disclosed herein. The drive system comprises a first belt driven flywheel whose sole purpose is to control the rotary motion of a tape capstan. A second flywheel, which is also driven by the same belt that drives the first flywheel, is selectively coupled to a toothed pinion which is in constant meshing engagement with a toothed wheel rigidly connected to the collecting reel shaft of the play-back and/or recording device. For fast forward operation an idler pulley, which is directly driven by the same belt that drives the first and second flywheels, has a toothed surface coupled to the pinion while the pinion is decoupled from being driven by the second flywheel. For fast rewind operation, the toothed surface of the idler wheel is directly coupled to a mating toothed surface of a wheel rigidly connected to the supply reel shaft of the play-back and/or recording device while the second flywheel is again decoupled from the toothed pinion. The positioning of the idler wheel is controlled by movement of a T-shaped lever pivotally mounted at two points to the frame of the play-back and/or recording device.

8 Claims, 4 Drawing Figures

TAPE DRIVING APPARATUS FOR TAPE PLAY-BACK AND/OR RECORDING DEVICES

BACKGROUND OF THE INVENTION

In play-back and/or recording devices it is often necessary to move a tape in both a forward and reverse direction at fixed speeds which are closely controlled. Tape driving systems which generally accomplish this function usually comprise a capstan shaft and a mating pressing element (pressure roller) which drive the tape between them at a constant speed and unwind the tape from one reel (a supplying reel) while simultaneously a suitable driving torque is applied to another reel (a collecting reel) which collects the tape. Generally in play-back and/or recording devices the tape can be moved at a normal forward play speed, at a fast forward speed, and at a fast reverse (fast rewind) speed.

For the normal play speed the angular velocity of the tape collecting reel must be variable. Generally a speed reducing friction coupler is coupled to a motor driven flywheel and the variable angular velocity of the collecting reel is provided by the natural reduction in speed which occurs as the wound tape circumference becomes larger. For fast forward operation, the shaft of the collecting reel is driven at an increased speed while the pressing element is moved away from the capstan shaft. For fast rewind operation the supplying reel becomes a driving reel while the collecting reel is decoupled from its drive source simultaneously with moving the pressing element away from the capstan shaft.

Many systems implement the aforementioned modes of operation for tape playing devices. Generally these tape drive systems use one or two rotating flywheels for implementing all of these driving modes. These flywheels are selectively used as driving sources for the supplying and collecting reel shafts by selectively coupling various wheels to the circumferences of the flywheels. However, the aforementioned systems do not produce very flat tape playing devices which are extremely desirable for portable or automotive applications. Furthermore, these systems run the risk of misaligning the coupling wheels which couple the flywheels to the reel shafts.

Some prior systems utilize the flywheel which drives the capstan as a power source to drive the collecting and supplying reels. This is generally accomplished by a coupler disc which is coaxial with the flywheel and which provides a friction drive for the collecting and supplying reels. These systems greatly increase the height dimension of the total tape drive system since the flywheel, the friction coupler disc, and the capstan shaft are all stacked on top of each other. These systems also have a problem in obtaining the proper driving speed for the collecting and supplying reels.

SUMMARY OF THE INVENTION

An object of this invention is to provide a tape drive system which overcomes the aforementioned drawbacks and provides a flat, sturdy mechanical structure for a tape playing and/or recording device.

In accordance with the present invention, flywheels are not used to provide the driving power for the fast forward and fast rewind operations. One flywheel is belt driven and has its rotary motion solely coupled to a tape capstan for the control thereof. A second flywheel, which is preferably driven by the same belt that drives the first flywheel, has its rotary motion selectively coupled to a drive wheel (preferably a toothed pinion) which is constantly in meshing engagement with a mating wheel on which the collecting reel shaft is mounted. For fast forward and fast rewind operation an idler pulley (preferably driven by the same belt that drives the first and second flywheels) is selectively positioned in engagement with either the drive wheel or another wheel on which the supplying reel shaft is mounted, while the second flywheel is simultaneously decoupled from the drive wheel. In this manner, a tape drive system is provided which readily implements all of the driving speeds required for the various modes of operation of a tape playing and/or recording device while providing a thin overall package for the device.

BRIEF DESCRIPTION OF THE DRAWINGS

The features and advantages of the present invention can be more readily understood by reference to the drawings in which.

DESCRIPTION OF THE PREFERRED EMBODIMENTS

Figure 1:
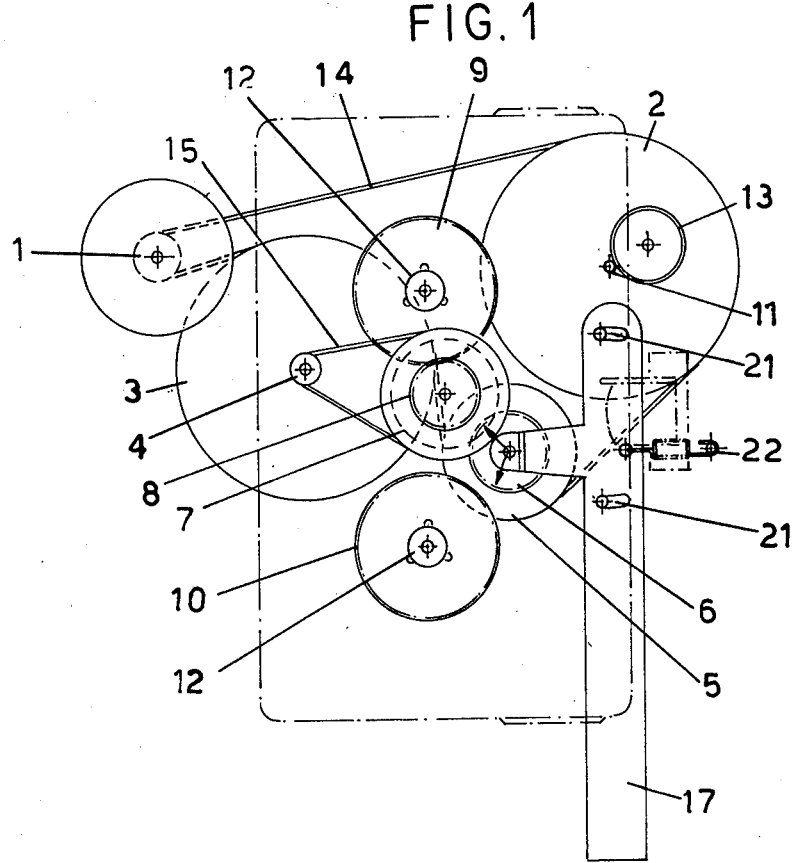
FIG. 1 is a diagrammatic plan view of a first embodiment of a tape driving system of the present invention.
Figure 2:
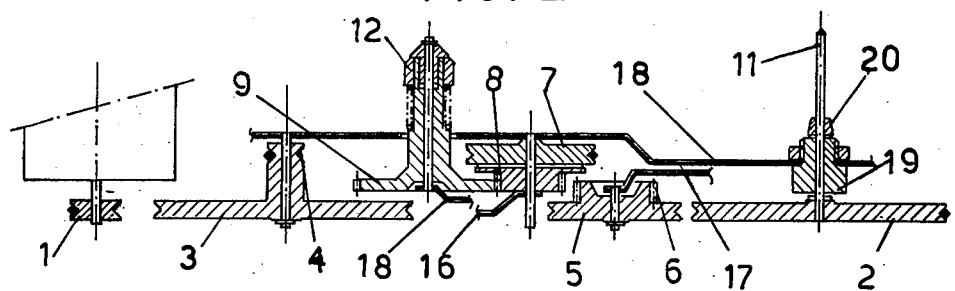
FIG. 2 is a diagrammatic cross-sectional view of the embodiment shown in FIG. 1.

With reference to the drawings, and in particular to FIGS. 1 and 2, a drive system of a tape player and/or recording device is illustrated. The drive system includes a flywheel 2 and a counter flywheel 3 which are driven by a belt 14 that is driven by a motor rotated pulley 1.

The belt driven flywheel 2 only functions to provide the driving movement of a capstan shaft 11, whereas the second belt driven flywheel 3 provides the drive power, only in the normal play mode of operation of the tape player device, for rotating a toothed wheel 9 on which a collecting reel shaft 12 is mounted.

In particular, a pulley 4 is integrally rotated by the flywheel 3 and is coupled through a belt 15 to a wheel 7 which has a race therein. As the wheel 7 turns it selectively transmits its motion to a toothed pinion (drive wheel) 8 which is always in meshing engagement with the toothed wheel 9. Therefore the flyweel 3 supplies a drive movement to the collecting reel shaft 12 during the normal play operation of the tape playing device.

A shiftable idler pulley 5 has an intergal toothed pinion 6 and the pulley can be positioned by a lever 17 in three different operating positions. In the first operating position, which corresponds to the normal forward play speed mode, the idler pulley is positioned as shown in FIG. 1 such that its toothed pinion 6 does not contact either the toothed pinion 8 of the wheel 7 or the teeth of a toothed wheel 10 on which a supplying reel shaft 12 is mounted for integral rotation. For fast forward operation the idler pulley 5 is shifted such that its toothed pinion 6 will contact the toothed pinion 8 of the wheel 7 and drive the toothed pinion 8 at a much faster rate than the drive provided by the belt 15. For fast reverse operation, the idler pulley 5 is shifted by the lever 17 such that its toothed pinion 6 will contact the toothed wheel 10 and drive the supply reel shaft 12 at a rapid rate.

As shown in FIG. 1 the idler pulley 5 is also driven by the motor driver belt 14 in the same manner as the flywheel 2 and the flywheel 3. The result of the drive system shown in FIG. 1 is that for selectively implementing fast forward and fast rewind operation of a tape player device, the flywheels 2 and 3 will not have to directly compensate for the fast tape acceleration provided during the fast rewind and fast forward modes of operation. In addition, the idler pulley 5 also increases the winding angle between the belt 14 and the flywheel 3 and therefore reduces belt slippage.

The directions in which the idler pulley 5 is shifted in order to implement the fast forward and fast rewind modes of operation are shown by arrows emanating from the central axis of the pulley 5 in FIG. 1. During the shifting of the idler pulley 5 to implement fast forward or fast rewind operation, it is of course understood that well known lever systems will provide for moving a pressing element 13 away from the capstan 11 as well as decoupling the drive between the flywheel 3 and the toothed pinion 8.

Figure 3:
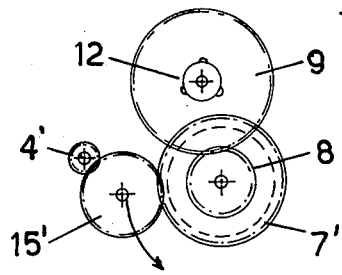
FIG. 3 is a diagrammatic plan view illustrating a first modification of the driving system shown in FIG. 1.

In FIG. 3, a modification of a portion of the present invention is illustrated in which identical numbers are used to identify corresponding components. In FIG. 3 the pulley 4 of the flywheel 3 is shown as comprising a toothed pinion 4' which selectively engages a shiftble toothed wheel 15' (that corresponds to the belt 15 in FIG. 1) which meshes with a toothed wheel 7'. The wheel 7', through the toothed pinion 8, provides all of the previously mentioned functions. In FIG. 3, the disengagement of the drive supplied by the flywheel 3 to the pinion 8 during fast forward and fast rewind operation is provided by moving the toothed wheel 15' away from the toothed pinion 4' or the toothed wheel 7' in the direction of the arrow shown in FIG. 3.

Of particular importance to the present invention is the configuration of the lever 17 which allows positioning the idler pulley 5 in its different positions for fast forward and fast rewind operation in response to shifting the lever 17 while providing a stable position for the idler 5 during the normal play operation of the tape recording device. The lever 17 is substantially T-shaped and the idler pulley 5 is mounted on the center arm of the lever 17 and is driven by the belt 14. The lever 17 is biased into a rest (normal) position shown in FIG. 1 through a return spring 22 which thereby positions the idler pulley 5 out of engagement with the toothed pinion 8 and the toothed wheel 10. This results in rotating the collecting reel shaft 12 of the toothed wheel 9 at a normal play speed by means of the flywheel 3 imparting rotary motion to the toothed pinion 8 through the belt 15 and the wheel 7.

Internal slots 21 are provided on each of the arms of the crossbar of the T-shaped lever 17 and within each of these slots are engageable corresponding pivot pins carried by a frame 18 of the tape playing device. Due to the bias provided by the spring 22, the lever 17 and idler pulley 5 will normally be positioned as shown in FIG. 1. In response to angularly shifting the lever 17 in the direction of the arrows shown in FIG. 1 at the end of the crossbar of the lever 17, the lever 17 will shift with respect to the frame 18 such that the lever will have a pivoting fulcrum that will correspond to either one of the pins in the slots 21 while the extent of the shifting motion of the lever 17 is controlled by the dimensions of the slot 21 which is not engaging the pin which serves as the fulcrum of the lever 17.

By shifting the lever 17 in either of the two directions indicated by the arrows at the crossbar of the lever, the lever will pivot about one of the two pins in the slots 21. Depending upon which way the lever is shifted, the idler pulley 5 will then mesh either the toothed pinion 8 of the wheel 7 so as to implement fast forward operation by rapidly driving toothed wheel 9, or the idler wheel 5 will mesh with the toothed wheel 10 for implementing fast rewind operation.

Figure 4:
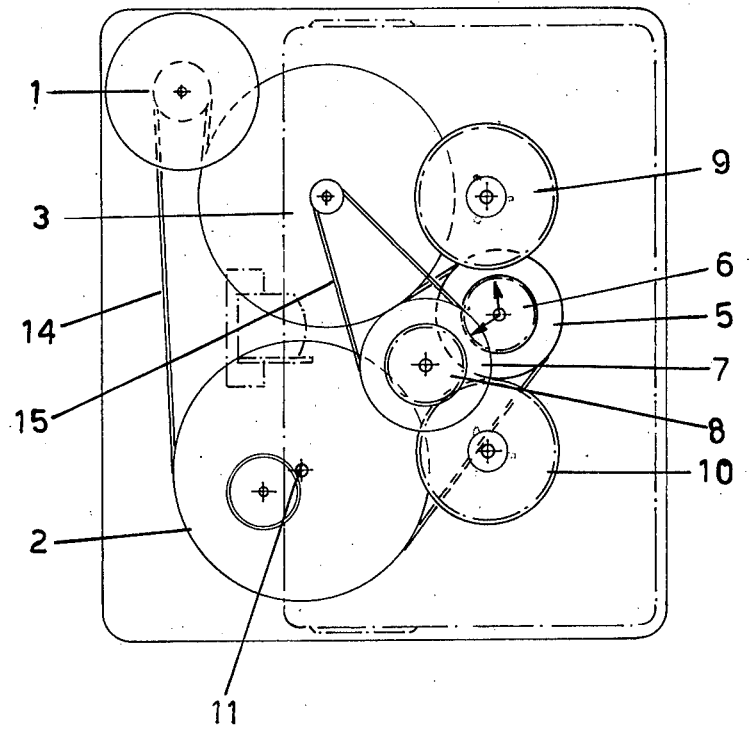
FIG. 4 is a diagrammatic plan view of another modification of the tape drive system of FIG. 1.

In FIG. 4 another arrangement of the basic elements of the tape drive system shown in FIG. 1 is illustrated as forming a more compact tape drive system. In FIG. 4 all corresponding elements are marked with identical numbers.

It is contemplated that the capstan 11 of the flywheel 2 be mounted thereto through a collar 20 and a bushing 19 and that these components will comprise a preassembled package.

It can be seen that the present invention has provided a compact tape drive system for a tape player/recorder apparatus in which flywheels are not used to drive the collecting or supplying reel shafts in either the fast forward or fast rewind modes of operation of the device. The fast forward and fast rewind drives are provided by a belt driven idler wheel that is selectively shiftable with respect to the collecting and supplying reel shafts and is driven by the same belt that drives both a first flywheel whose rotary motion is used to solely control the capstan of the device and a second flywheel whose rotary motion is used to provide the drive for the collecting reel shaft during the normal play mode operation of the device.

While I have shown and described specific embodiments of this invention, further modifications and improvements will occur to those skilled in the art. All such modifications which retain the basic underlying principles disclosed and claimed herein are within the scope of this invention.

I claim:

1. A tape drive system for a tape playback and/or recording device, comprising:
    a tape capstan;
    a first driven flywheel coupled to said tape capstan, the rotary motion of said first flywheel being solely coupled to and controlling said tape capstan;
    a toothed wheel and a tape collecting reel shaft attached to said toothed wheel;
    a wheel on which a tape supplying reel shaft is attached;
    a toothed drive wheel coupled in continuous meshing engagement with said toothed collecting reel shaft wheel;
    a second driven flywheel;
    means for selectively coupling said second flywheel to said toothed drive wheel, the rotary motion of said second flywheel means being selectively coupled to and controlling the rotation of said toothed drive wheel during a play mode of said tape drive system;
    an idler wheel;
    means coupled to said first and second flywheels and said idler wheel for rotationally driving them; and
    means for selectively shifting said idler wheel from a normal play position into a fast forward position in which said idler wheel is in meshing engagement with said toothed wheel that drives said collecting reel shaft wheel, and for shifting said idler wheel from said normal play position into a fast rewind position in which said idler wheel is directly in meshing engagement with the wheel to which said supplying reel shaft is attached to, wherein said shifting means implements fast forward and fast rewind modes of operation.

2. A tape drive system according to claim 1 which includes a frame for said tape drive system and at least two pivot pins carried by said frame, and in which said shifting means includes a T-shaped lever having a center arm carrying said idler wheel and a crossbar having a slot on each arm portion of the crossbar, the two slots selectively engaging said pivot pins carried by said frame of the tape drive system, each of said pivot pins located within one of said slots, said pins functioning as fulcrums for the lever for shifting the position of the idler wheel in response to shifting of the T-shaped lever, the shifting means also including a spring means for positioning the T-shaped lever in a neutral position determined by the pivot pins engaging both slots in the T-shaped lever.

3. A tape drive system according to claim 1 in which said coupling means includes disengageable mechanical coupling means for coupling said second flywheel to said toothed drive wheel during said normal play mode of operation and decoupling said second flywheel from said toothed drive wheel during said fast forward and fast rewind modes of operation.

4. A tape drive system according to claim 1 wherein said rotational driving means comprises a motor, a shaft driven by said motor, at least one pulley attached to said motor driven shaft and at least one driving belt coupled to said motor pulley, said first and second flywheels and said idler wheel.

5. A tape drive system for a tape play-back and/or recording device, comprising:
 a tape capstan;
 a first driven flywheel coupled to said tape capstan, the rotary motion of said first flywheel being solely coupled to and controlling the tape capstan;
 a wheel having a tape collecting reel shaft attached to said wheel;
 a wheel having a tape supplying reel shaft attached to said wheel;
 a drive wheel coupled in continuous engagement with said collecting reel shaft wheel;
 a second driven flywheel;
 means for selectively coupling said second flywheel to said drive wheel, the rotary motion of said second flywheel being selectively coupled to and controlling the rotation of said drive wheel during a play mode of said tape drive system;
 an idler wheel;
 means coupled to said first and second flywheels and said idler wheel for rotationally driving them; and
 means for selectively shifting said idler wheel from a normal play position into a fast forward position in which said idler wheel is in engagement with said drive wheel that drives said collecting reel shaft wheel, and for shifting said idler wheel from said normal play position into a fast rewind position in which said idler wheel is directly in engagement with said supplying reel shaft wheel, wherein said shifting means implements fast forward and fast rewind modes of operation.

6. A tape drive system according to claim 5 which includes a frame for said tape drive system and at least two pivot pins carried by said frame, and in which said shifting means includes a T-shaped lever having a center arm carrying said idler wheel and a crossbar having a slot on each arm portion of the crossbar, the two slots selectively engaging said pivot pins carried by said frame of the tape drive system, each of said pivot pins located within one of said slots, said pins functioning as fulcrums for the lever for shifting the position of the idler wheel in response to shifting of the T-shaped lever, the shifting means also including a spring means for positioning the T-shaped lever in a neutral position determined by the pivot pins engaging both slots in the T-shaped lever.

7. A tape drive system according to claim 5 in which said coupling means includes mechanical coupling means for coupling said second flywheel to said drive wheel during the normal play mode of operation of the tape drive system and for decoupling said second flywheel from said drive wheel during the fast forward and fast rewind modes of operation of the tape drive system.

8. A tape drive system according to claim 5 wherein said rotational driving means comprises a motor, a shaft driven by said motor, at least one pulley attached to said motor driven shaft and at least one driving belt coupled to said pulley, said first and second flywheels and said idler wheel.

* * * * *